(12) United States Patent
Kuo et al.

(10) Patent No.: US 7,652,720 B2
(45) Date of Patent: Jan. 26, 2010

(54) OPENING STRUCTURE OF PORTABLE APPARATUS

(75) Inventors: Yan-Lin Kuo, Taipei Hsien (TW); Tsan-Shenh Chen, Taipei Hsien (TW); Sheng Kuo Jonathan Chang, Taipei Hsien (TW); Ker Wei Lin, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 345 days.

(21) Appl. No.: 11/812,824

(22) Filed: Jun. 22, 2007

(65) Prior Publication Data

US 2008/0198262 A1    Aug. 21, 2008

(30) Foreign Application Priority Data

Feb. 16, 2007    (TW) .............................. 96106391 A

(51) Int. Cl.
*H04N 5/225*    (2006.01)
(52) U.S. Cl. ..................... 348/376; 348/375; 292/163; 455/556.1
(58) Field of Classification Search ............. None
See application file for complete search history.

(56) References Cited

U.S. PATENT DOCUMENTS

| | | | |
|---|---|---|---|
| 5,077,551 A * | 12/1991 | Saitou | 345/207 |
| 6,243,819 B1 * | 6/2001 | Jung | 713/320 |
| 6,704,194 B2 * | 3/2004 | Koo | 361/679.27 |
| 6,965,512 B2 * | 11/2005 | Huang et al. | 361/679.59 |
| 7,181,238 B2 * | 2/2007 | Chiang | 455/556.1 |
| 7,549,684 B2 * | 6/2009 | Shi et al. | 292/37 |
| 2005/0201047 A1 * | 9/2005 | Krah | 361/683 |

* cited by examiner

*Primary Examiner*—Tuan Ho
*Assistant Examiner*—Euel K Cowan
(74) *Attorney, Agent, or Firm*—Rosenberg, Klein & Lee

(57) ABSTRACT

An opening structure of a portable apparatus includes a hook module and a camera module installed on a cover of the portable apparatus. The hook module includes at least one hook portion, at least one retaining portion and at least one resilient member. The camera module includes a casing, a camera lens and an axle, and a conversion component is connected to the axle. The hook portion is disposed on the retaining portion, and a resilience member is connected separately to the retaining portion and the cover, and the casing includes a camera lens and an axle installed on the casing. If the axle is rotated to produce a rotation force, the conversion component will convert the rotation force into a pushing force which will push the hook module to trigger a switch installed at the cover and turn on the portable hook module while the cover is being opened.

12 Claims, 7 Drawing Sheets

OPENING STRUCTURE OF PORTABLE APPARATUS

BACKGROUND OF THE INVENTION

1. Field of the Invention

The present invention relates to an opening structure of a portable apparatus, and more particularly to a technique is integrated with a camera lens and a switch and capable of opening a cover and a portable apparatus by turning the opening structure.

2. Description of the Related Art

Referring to FIG. 1 for a casing of a conventional portable apparatus, the casing includes a cover 11, at least one hook 13 and a camera module 12. The hook 13 is fixed onto the cover 11, and the camera module 12 is installed on the cover 11 by an axle (not shown in the figure), such that the camera module 12 can be turned with respect to the cover 11 to adjust the direction of the camera module 12. If it is necessary to open the casing, the hook 13 can be released by a press button of a main body (not shown in the figure) of the portable apparatus to open the casing of the portable apparatus.

Even though the hook 13 can be released by the press button of the main body of the portable apparatus, the hook 13 is not related to the operation of opening the cover 11 and the camera module 12, and thus such operation of opening the cover is still not very convenient. As to the external appearance of the main body of the portable apparatus, the press button is designed on the main body and provided for pushing the hook 13, and such arrangement affects the artistic look of the portable apparatus.

To achieve a simple way of opening the cover, the inventor of the present invention based on years of experience in the related industry to conducted extensive researches and experiments, and finally developed an opening structure of a portable apparatus in accordance with the present invention to open the cover by turning the opening structure.

SUMMARY OF THE INVENTION

The primary objective of the present invention is to overcome the foregoing shortcomings of the prior art by providing an opening structure of a portable apparatus, and the opening structure is integrated with a camera module and cable of opening the cover by turning the opening structure.

Another objective of the present invention is to turn on the portable apparatus while the cover is being opened.

To achieve the foregoing primary objectives, the present invention provides an opening structure of a portable apparatus, and the structure comprises a hook module and a camera module installed on a cover of the portable apparatus, and the hook module has at least one hook portion, at least one retaining portion and at least one resilient member, and the hook portion is disposed on the retaining portion, and a resilience is provided to the retaining portion by a resilient member, and the camera module has at least one axle, wherein the opening structure is characterized in that the retaining portion has a slope, and both ends of the axle of the camera module are connected separately to a conversion component for converting a rotation force of the axle into a pushing force, and the pushing force pushes the retaining portion of the hook module with respect to a slope of the conversion component, so that the hook module can be shifted to open the cover.

To achieve another objective, the present invention provides an opening structure of a portable apparatus, and the structure further comprises a switch, such that when the hook module is shifted to trigger the switch of the cover, the portable apparatus is turned on while the cover is being opened.

To make it easier for our examiner to understand the technical characteristics and performance of the present invention, we use preferred embodiments with the attached drawings for the detailed description of the invention.

DETAILED DESCRIPTION OF THE PREFERRED EMBODIMENTS

For simplicity, like numerals are used for like elements for the description of the specification of the present invention as follows.

Figure 1:
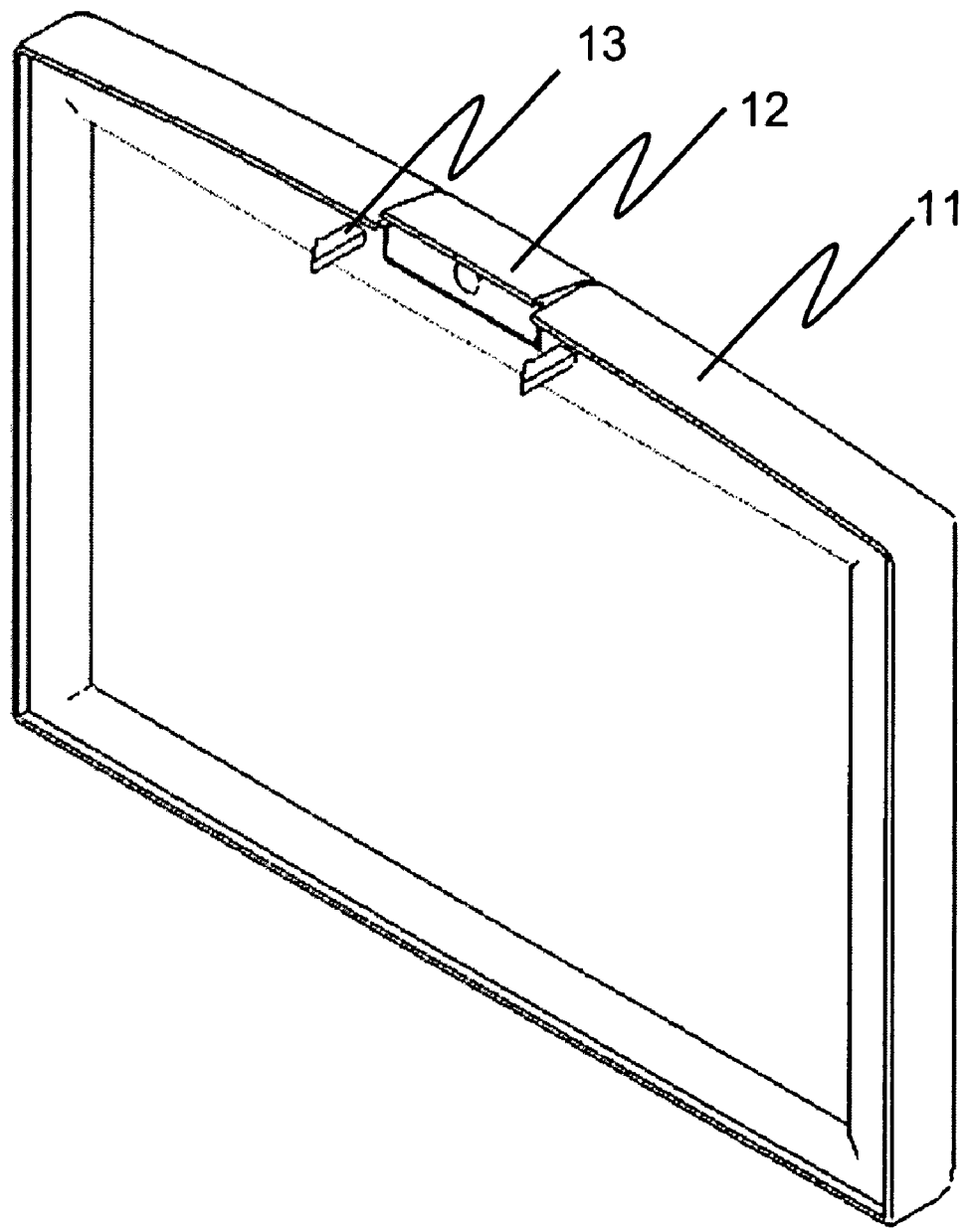
FIG. 1 is a conventional cover of a portable apparatus.
Figure 2:
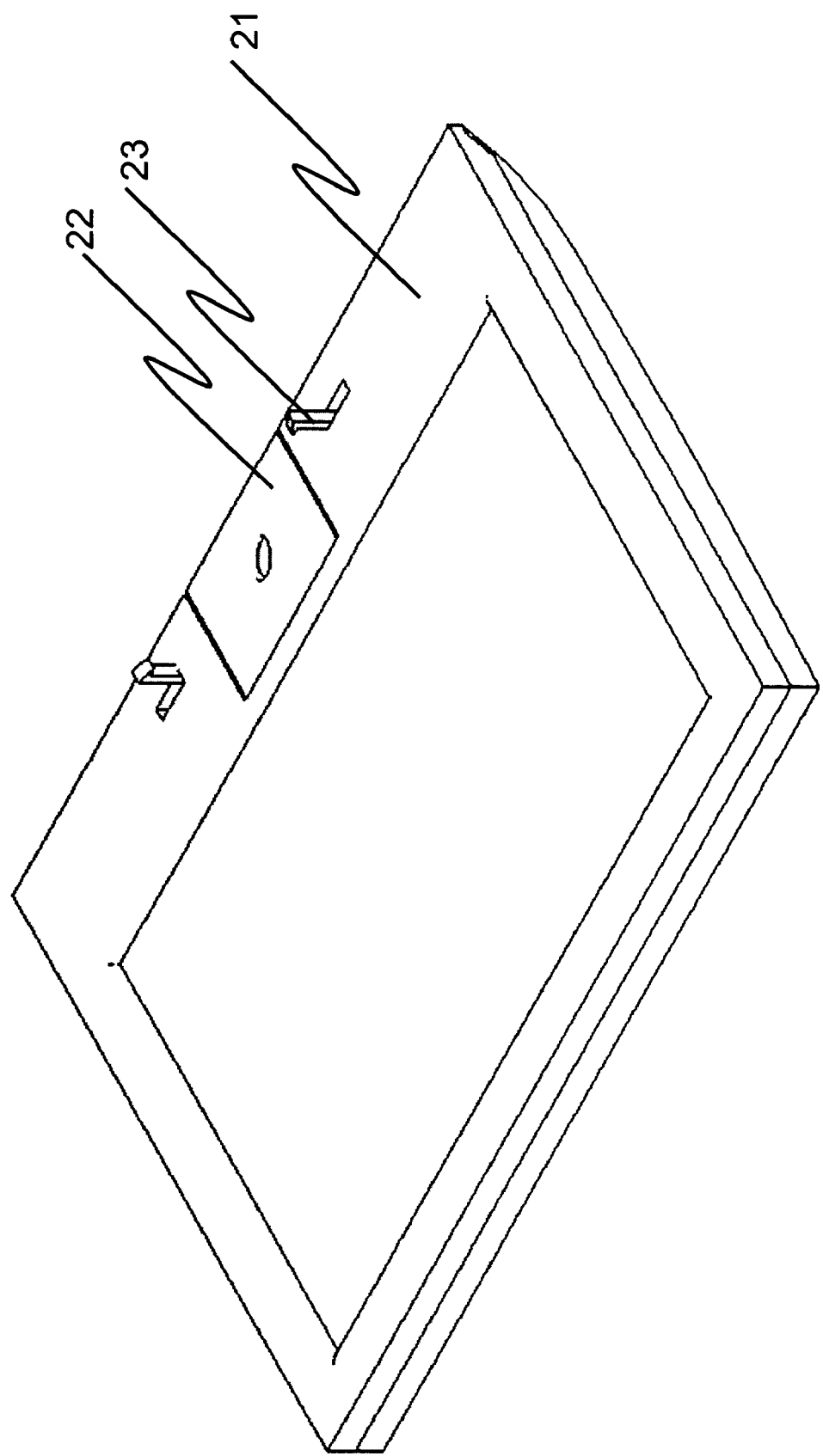
FIG. 2 is a perspective view of an opening structure of a portable apparatus in accordance with a first preferred embodiment of the present invention.
Figure 3:
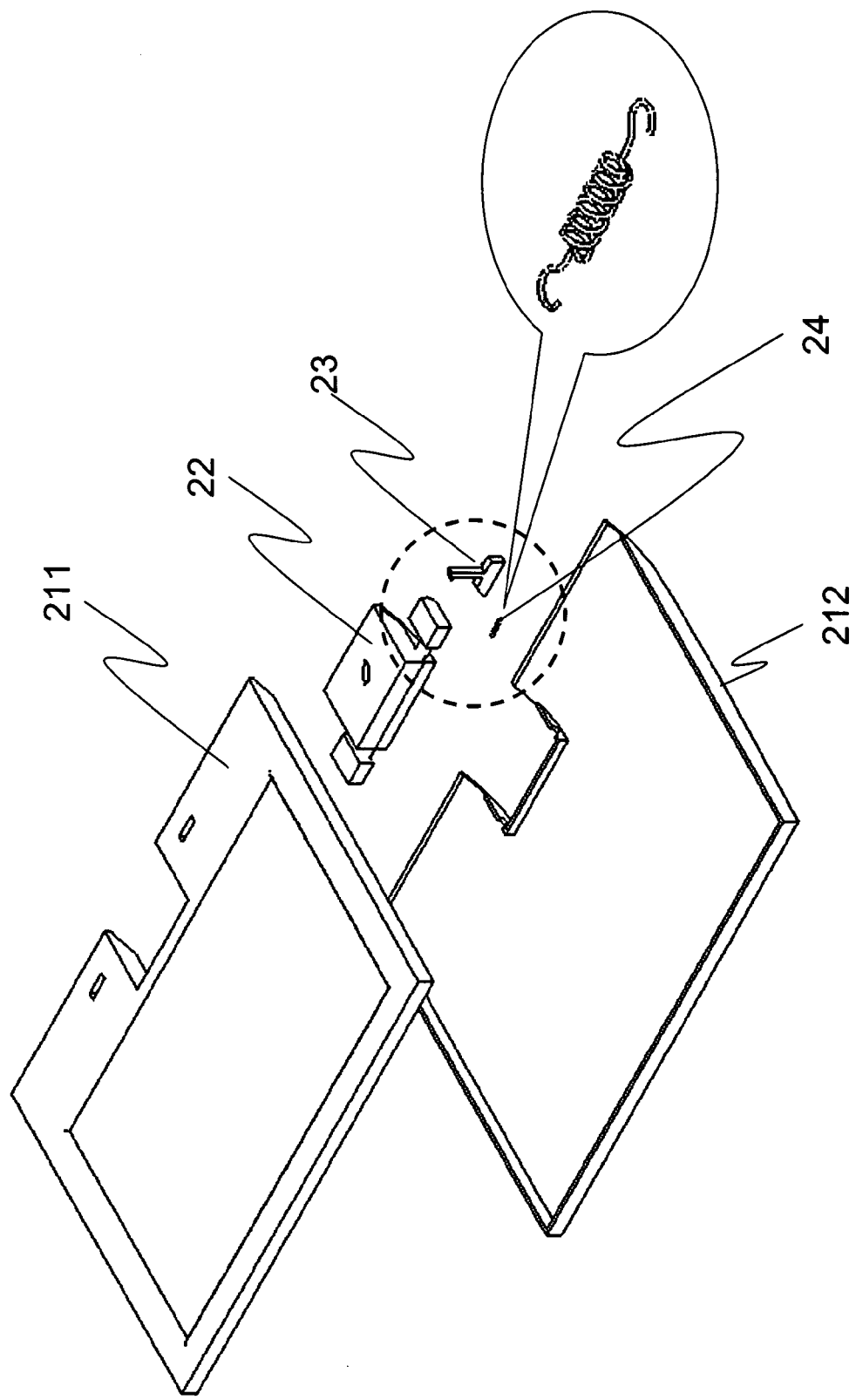
FIG. 3 is an exploded view of an opening structure of a portable apparatus in accordance with a first preferred embodiment of the present invention.

Referring to FIGS. 2 and 3 for a perspective view and an exploded view of an opening structure of a portable apparatus in accordance with the present invention respectively, the opening structure of the portable apparatus comprises a cover 21, a camera module 22 and a hook module 23, wherein the cover 21 has an upper casing 211 and a lower casing 212, and the camera module 22 is installed in a slot of the cover 21, and the hook module 23 and its resilient member 24 are installed between the upper casing 211 and the lower casing 212 of the cover 21.

Figure 4:
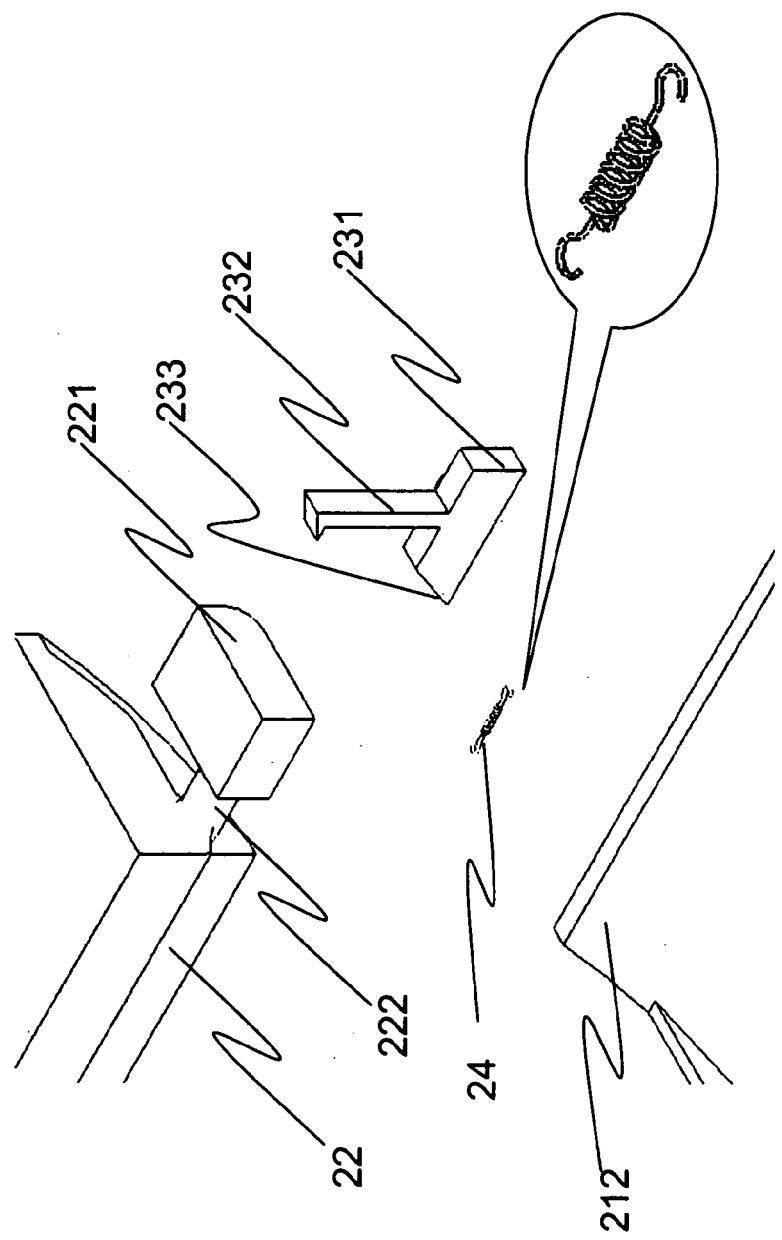
FIG. 4 is a schematic enlarged view of a portion of an opening structure of a portable apparatus in accordance with a first preferred embodiment of the present invention.

Referring to FIG. 4 for a schematic enlarged view of a portion of an opening structure of a portable apparatus, the camera module 22 has a conversion component 221 and an axle 222, and the axle 222 is installed in a hole of the slot, and the conversion component 221 is installed in a direction perpendicular to the axial direction of the axle 222, and the hook module 23 has a retaining portion 231, a hook portion 232, a slope 233, and a resilient member 24. If the camera module 22 is turned, the axle 222 will be rotated accordingly, and the rotation force of the axle 222 drives the conversion component 221 to produce a pushing force at an end of the conversion component 221 and push the slope 233 of the hook module 23, such that the retaining portion 231 in the hook module 23 can be shifted to move the hook portion 232 in the hook module 23 and release a main body (not shown in the figure) of the portable apparatus to open the cover 21 of the portable apparatus. Both ends of the resilient member 24 are connected separately to the lower casing 212 of the cover 21 of the portable apparatus and a retaining portion 231 of the hook module 23, such that after the hook module 23 is shifted, the resilience produced by the resilient member 24 resumes the retaining portion 231 to its original position.

The conversion component is comprised of a gear set for converting the rotation force of the axle into a pushing force, and increase the pushing distance of the pushing force by extending the traveling path.

Figure 5:
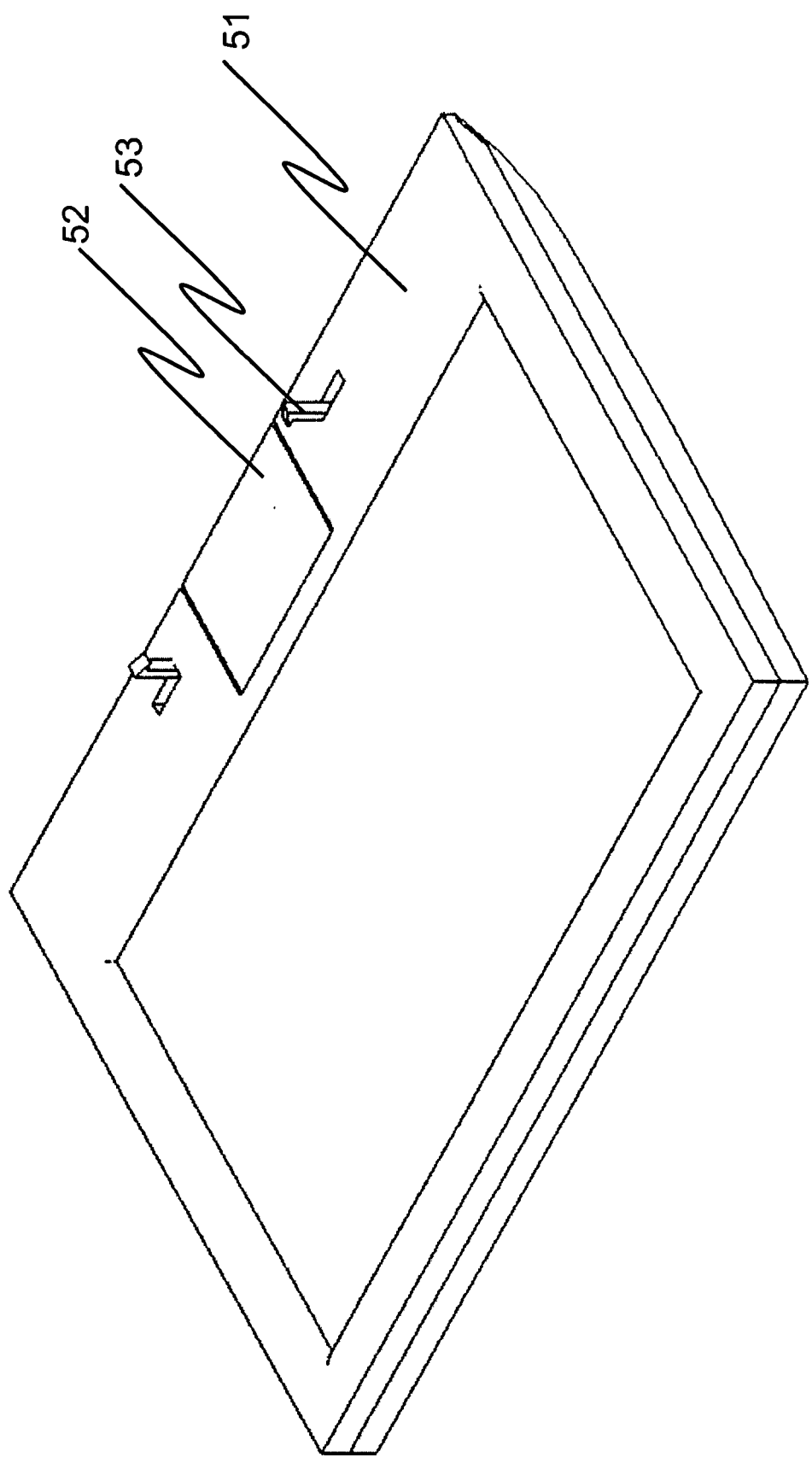
FIG. 5 is a perspective of an opening structure of a portable apparatus in accordance with a second preferred embodiment of the present invention.
Figure 6:
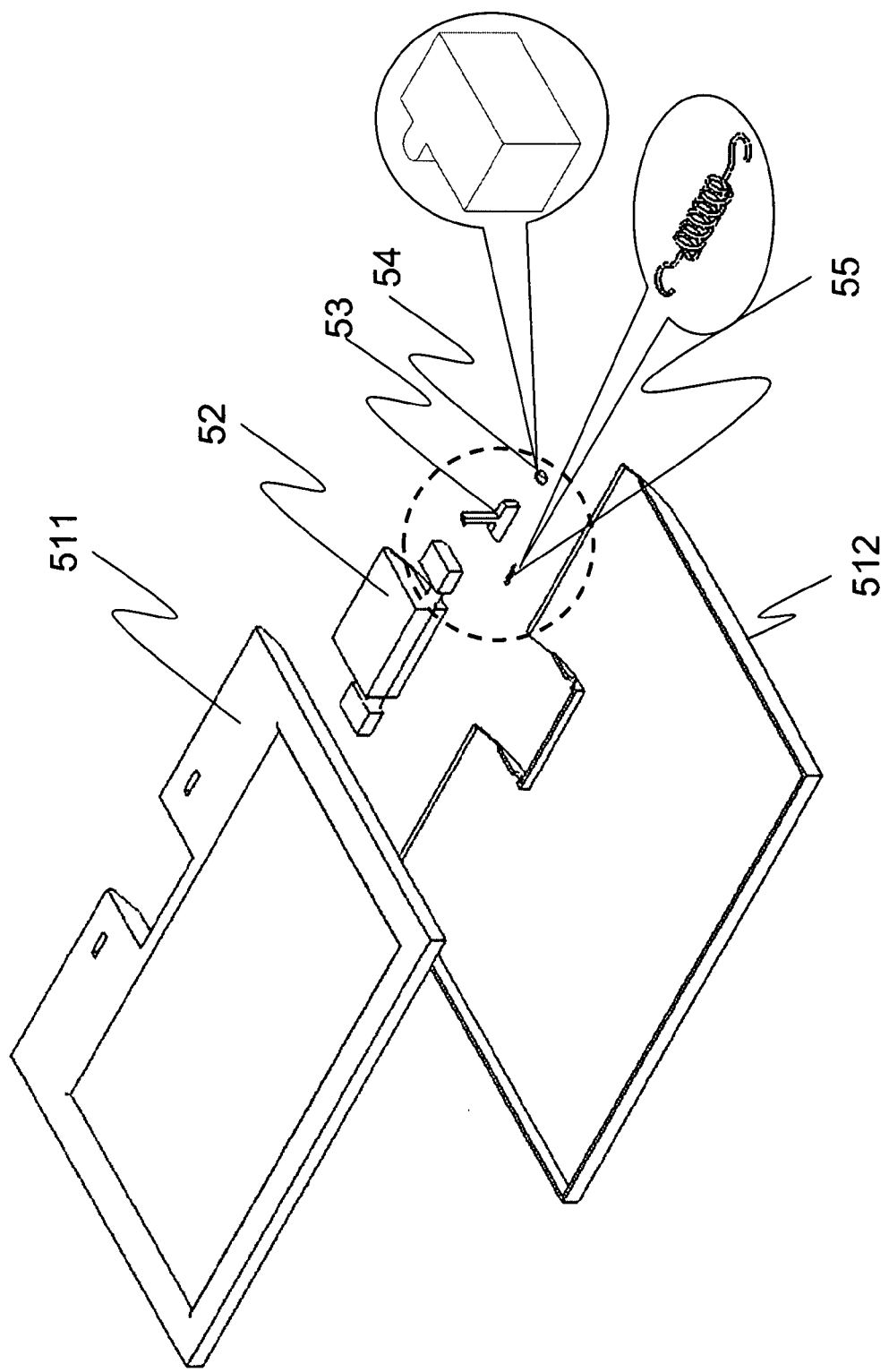
FIG. 6 is an exploded view of another opening structure of a portable apparatus in accordance with the present invention.

Referring to FIGS. 5 and 6 for an opening structure of a portable apparatus in accordance with a second preferred embodiment of the present invention, the opening structure 3 of a portable apparatus comprises a cover 51, a lift cover module 52, a hook module 53 and a switch 54, wherein the cover 51 has an upper casing 511 and a lower casing 512, and the lift cover module 52 is installed in a slot of the cover 51, and the hook module 53, its resilient member 55 and the switch 54 are installed between the upper casing 511 and the lower casing 512 of the cover 51.

Figure 7:
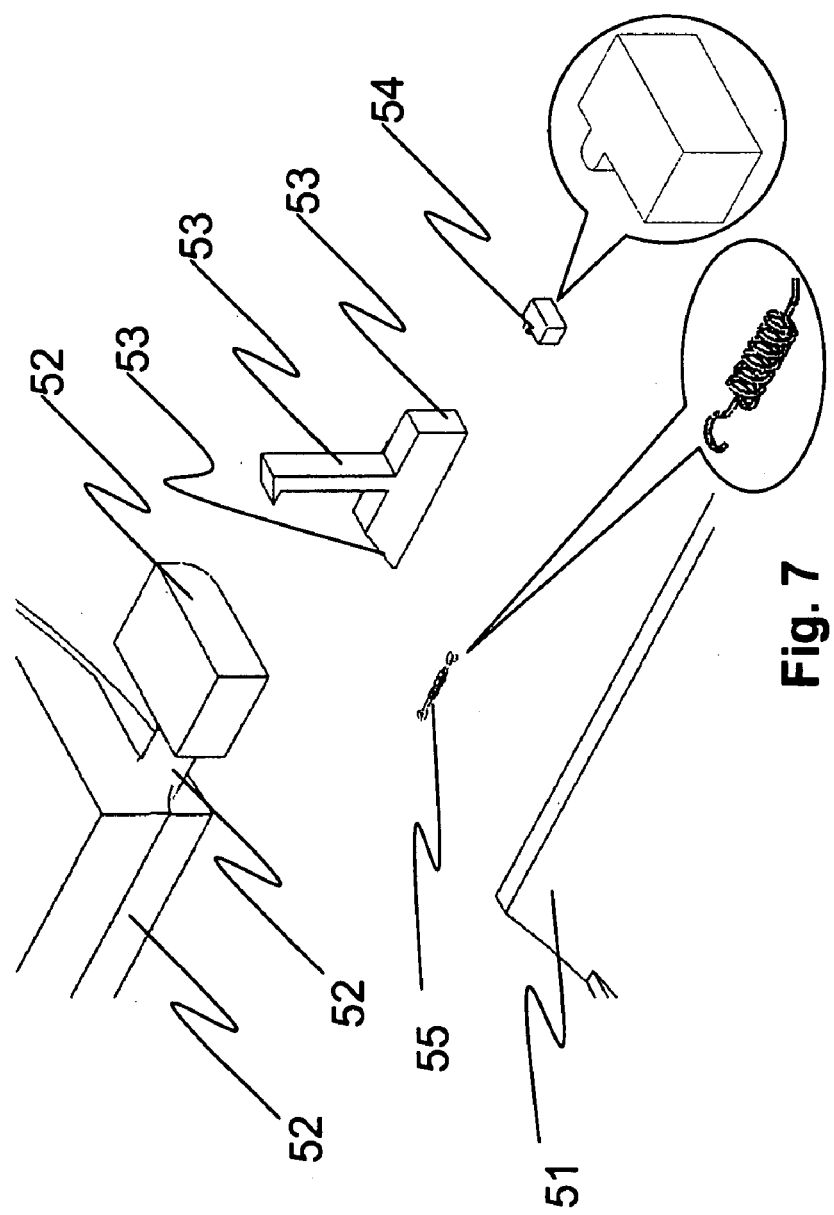
FIG. 7 is a schematic enlarged view of a portion of an opening structure of a portable apparatus in accordance with a second preferred embodiment of the present invention

Referring to FIG. 7 for a schematic enlarged view of a portion of an opening structure of a portable apparatus in accordance with a second preferred embodiment of the present invention, the lift cover module 52 has a conversion component 521 and an axle 522, and the axle 522 is installed in a hole of the slot, and the conversion component 521 is installed in a direction perpendicular to the axial direction of the axle 522, and the hook module 53 has a retaining portion 531, a hook portion 532, a slope 533, and a resilient member 55. If the lift cover module 52 is turned, the axle 522 will be rotated accordingly, and the rotation force of the axle 522 drives the conversion component 521 to produce a pushing force at an end of the conversion component 521 and push the slope 533 of the hook module 53, such that the retaining portion 531 in the hook module 53 is shifted to move the hook portion 532 in the hook module 53 and release a main body (not shown in the figure) of the portable apparatus to open the cover 51 of the portable apparatus. Both ends of the resilient member 55 are connected to the lower casing 512 of the cover 51 of the portable apparatus and the retaining portion 531 of the hook module 53 respectively, such that after the hook module 53 is shifted, the resilience produced by resilient member 55 resumes the retaining portion 531 to its original position. If the retaining portion 531 of the hook module 53 is shifted, the switch 54 will be triggered to turn on the portable apparatus while the cover 51 is being opened.

The conversion component is comprised of a gear set for converting the rotation force of the axle into a pushing force, and increase the pushing distance of the pushing force by extending the traveling path.

In summation of the description above, the present invention enhances the prior art and also complies with the patent application requirements. The description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An opening structure of a portable apparatus, comprising a hook module and a camera module, both disposed on a cover of said portable apparatus, said hook module has at least one hook portion, at least one retaining portion, and at least one resilient member, said hook portion is disposed on said retaining portion, a resilience is provided to said retaining portion by said resilient member, said camera module has at least one axle; characterized in that both ends of said axle of said camera module are connected separately to a conversion component, for converting the rotation force of said axle into a pushing force, said pushing force pushes said retaining portion of said hook module to move said hook module with respect to a slope of said conversion component, so as to open said cover.

2. The opening structure of claim 1, wherein resilient member has two ends, one for connecting said cover and another for connecting said retaining portion, such that if said retaining portion is shifted to produce a resilience to said resilient member, said retaining portion will resume its original position.

3. The opening structure of claim 1, wherein said camera module further comprises a casing, a camera lens and said axle, said camera lens is disposed in said casing, said axle is installed on said casing.

4. The opening structure of claim 1, wherein said conversion component is a slab, said slab is disposed in a direction perpendicular to the axial direction of said axle, the rotation force of said axle drives said slab to generate the pushing force at an end of said slab.

5. The opening structure of claim 1, wherein said conversion component is a gear set for converting the rotation force into the pushing force.

6. The opening structure of a portable apparatus of claim 1, wherein cover has a slot for containing said camera module, said slot further has at least one hole for installing said axle.

7. An opening structure of a portable apparatus, comprising a hook module disposed on a cover of said portable apparatus, said hook module has at least one hook portion, at least one retaining portion and at least one resilient member, said hook portion is disposed on said retaining portion, a resilience is provided to said retaining portion by said resilient member; characterized in that a lift cover module is installed on said cover, a switch is installed corresponding to said hook module, said lift cover module has at least one axle, both ends of said axle are connected separately to a conversion component, for converting a rotation force of said axle into a pushing force, the pushing force pushes said retaining portion of said hook module to move said hook module to trigger said switch of said cover to turn on said portable apparatus while said cover is being opened.

8. The opening structure of claim 7, wherein resilient member has two ends, one for connecting said cover and another for connecting said retaining portion, such that if said retaining portion is shifted to produce a resilience to said resilient member, said retaining portion will resume its original position.

9. The opening structure of claim 7, wherein said lift cover module has a casing and an axle disposed on said casing.

10. The opening structure of claim 7, wherein said conversion component is a slab, and said slab is disposed in a direction perpendicular to the axial direction of said axle, and the rotation force of said axle drives said slab, for generating the pushing force at an end of said slab.

11. The opening structure of claim 7, wherein said conversion component is a gear set for converting the rotation force into the pushing force.

12. The opening structure of claim 7, wherein said cover has a slot for containing said lift cover module, and said slot further comprises at least one hole for installing said axle.

* * * * *